Patented July 5, 1927.

1,634,879

UNITED STATES PATENT OFFICE.

DINSHAW RATTONJI NANJI, OF BIRMINGHAM, AND FREDERIC JAMES PATON, OF SMETHWICK, ENGLAND.

MANUFACTURE OF PECTIN PRODUCTS.

No Drawing. Application filed January 15, 1926, Serial No. 81,593, and in Great Britain December 28, 1925.

Our invention relates to the production of substances containing pectin and its derivatives, which are suitable for various purposes such as in the manufacture of jam, jellies, marmalades and confectionery.

It has been observed that pectic substances contained in plant tissues exist in several well-marked modifications, and these behave very differently with the solvents hitherto used in the manufacture of pectinous substances.

Pectinous substances in plant tissues exist in four forms (1) We have pectinogen the parent substance, readily extractable by hot water; (2), pectinogen existing in an insoluble modification in loose combination with metallic ions and convertible into form, (1) only slowly and incompletely by boiling with water, but readily with dilute acids. The pectin substances in the above two forms are recognized as methyl esters of pectic acid. These on de-esterification give rise to (3) pectic acid which is insoluble in water and in dilute acids but soluble in dilute alkalis and salts of strong bases and weak acids and solutions of certain dilute salts forming soluble salts such as those of sodium, potassium and ammonium. De-esterified pectin in plant tissues is, however, not found in form (3) to any marked extent, but exists mostly in the neutral form as an insoluble salt such as (4) calcium pectate.

The relative amounts of these four forms vary according to the stage of growth of the plant tissue.

It is evident from the above considerations that in the processes hitherto proposed for the manufacture of pectic substances based on their extraction with water or dilute acids complete extraction is not achieved.

Moreover in most of these processes, wherein dilute acids are employed as solvents, pectin is always obtained in dilute solution which requires concentration. During the extraction there is a risk of the hydrolysis of pectinogen, and this occurs also during the subsequent concentration unless evaporation in vacuo is resorted to.

The object of the present invention is the treatment of plant materials containing pectin in such a manner that substantially complete extraction is achieved in a very short time and such that under suitable conditions the extracts can be obtained directly in a concentrated form, thus obviating the necessity for evaporation.

A further object of the invention is, to avoid the necessity for the preliminary treatment for removal of sugars, which has hitherto been found to be essential in processes using acids for the extraction, if the pectinous extract after concentration is to remain non-jellifying. This was unavoidable in these processes, since a mixture of pectin and sugar readily undergoes jellification in the presence of acids.

In accordance with the present invention plant materials containing pectin are treated with very dilute solution of salts, which have the power of rendering soluble all the pectinous material so that the latter may be substantially completely extracted from the raw material. The utility of any salt for the purpose depends on its capability of readily undergoing ionic exchange with the insoluble pectin compounds. The simultaneous formation then takes place of a soluble pectin, whose solubility depends on the kation of the salt added being taken up by the pectinous material, and of an insoluble or soluble salt of calcium, magnesium, or iron with which metals the pectin is combined in the raw material.

While we have mentioned salts capable of giving either insoluble or soluble salts of calcium etc., we strongly prefer the former in carrying out the process. Salts of ammonium or of the alkali metals are suitable for displacing the naturally occurring metal in the pectinous material and acidic radicles which may be employed are those capable of forming insoluble compounds with the alkaline earth metals such as calcium. The ammonium ion is particularly valuable in the form of ammonium sulphate, phosphate, tartrate, citrate, and other salts having the necessary properties. The salts used, which may be either neutral or acidic, thus react with the pectinous substances producing soluble forms of both pectinogen and pectic acid without involving the decomposition of the latter.

We are aware that it has been proposed to precipitate pectin from solutions by the addition of an oppositely charged colloidal metallic hydroxide in which case salt formation is not involved, the precipitation in that case being a purely physical phenomenon.

Also it has been previously proposed to treat pulp containing pectous substances with an alkaline solution and to precipitate the pectic acid by the use of an acid. It has been suggested that this precipitate could be intimately mixed with a dispersing agent consisting of an alkali metal salt to form a gel, such salt being used in amounts about equal by weight to the amount of pectic substance used.

The nature of the solvents allows of the extraction being carried out under pressure at suitable temperatures. Also, as we employ very dilute solutions of salts, the presence of sugars in the material to be submitted to extraction does not matter, so that the expense of its preliminary removal is avoided. If neutral salts are employed the removal of the sugars is in any case unnecessary.

If, however, there is an excessive amount of natural acidity in the material to be treated, this may be reduced sufficiently by a process of electrodialysis, in this way it being possible to remove the acidity without neutralization, so that the removal of the sugar is unnecessary. In cases, however, where the presence of sugar is not material, such as with apple pomace or exhausted beet cosettes, these may be washed with cold water if necessary.

It has been found that jellifying capacity of pectin concentrates is, to some extent, dependent upon their content of calcium ions. Now according to our process of pectin extraction the calcium content of the raw material is partially removed, so that there may possibly be, in some cases, a deficiency of calcium ions in the product. Therefore, if it should be found that a pectin preparation made in accordance with our invention fails to jellify satisfactorily, we could augment the jellifying power by the discreet addition of calcium salts.

With such preparations possessing optimum jellifying power, it is possible to effect considerable economies in the sugar consumption in the manufacture of jams etc. Also with such products jellies can be produced with practically half the amount of acid normally required. It must be mentioned that this effect of calcium ion is manifested in extremely minute concentrations, the optimum being 0.2% calcium.

The pectin concentrate after having been prepared and stored may be acidified to a suitable degree for practical use by the addition of the requisite quantity of a suitable acid for jellification, or the necessary acidity may be produced in the material by the removal of the kation of the added salt by electro-dialysis, the amount of the added salt being generally in excess of the requirement of the main process.

The actual method of procedure varies according to the nature of the material, but as an example of the application of our invention we may cite the following:—

The material such as apple pomace or beet pulp, or any other plant material, or waste residues therefrom, containing pectin, is first thoroughly disintegrated. Either wet or dried material may be employed, but since the efficiency of the extraction depends upon the physical condition, it is of advantage to dry it at a temperature which does not involve any decomposition of the pectin. It then lends itself to ready disintegration.

One ton of the dried material e. g., apple pomace, suitably treated as indicated above, is treated with about 1,000 gallons of 0.1–0.5% solution of ammonium tartrate at a temperature of 120° in a closed vessel and thus under pressure for a period of ten to thirty minutes. The extract thus obtained is pressed out in a suitable press, and the residue again extracted as before with a fresh quantity of the solvents allowing for the amount of the solution unexpressed. This extraction is repeated until the residue does not contain any appreciable pectin. This requires about three extractions.

These extracts are then used again and again to extract fresh pomace, and the residues therefrom, according to the principles generally applied, in such continuous processes. In this way we obtain directly a concentrated extract containing pectin without evaporation. It is obvious that solutions of other salts can be used, and all conditions such as the relative amounts of the solvent and the material, the concentration of the salt solution, the temperature and the time of extraction may all be varied without altering the principle of our process. The extraction may also be carried out at ordinary pressure.

The extracts, if turbid, can be cleared by suitable adsorbents and filtered or centrifuged in a convenient manner. We thus obtain a minimum yield of from two to three tons of concentrated pectin extract approximating to a yield of solids of thirty-five per cent of the pomace employed. Such extracts which contain pectin and its derivatives have excellent jellifying properties when acidified and heated with the necessary amount of sugar, and are thus eminently suitable for use in the manufacture of jam, jellies, marmalades, and confectionery.

The pectin may be sterilized and stored in suitable vessels for an indefinite period, or it may be mixed with a sufficient concentration of any sugar, such as cane sugar, maltose, glucose etc., or preferably mixtures of these in suitable proportions to enable the product to withstand infection by micro-organisms during storage.

Alternatively, it can also be preserved by the addition of non-miscible volatile or non-volatile substances inhibiting the growth of micro-organisms, and which can be readily and completely expelled with, or without, heating when required for use in food stuffs. The methods of preservation and storage are given by way of example only, and no claim is made to these methods per se. The products obtained may also be converted into solid forms by the well known processes of film evaporation in a vacuum, or by any suitable methods of evaporation.

We have discovered that the principle of our invention—viz that of rendering all pectin substances soluble by the process substantially as described, is particularly applicable to the manufacture of jams, jellies and preserves from all dried fruits in which a considerable part of the pectin has been rendered insoluble during drying. For example, if prunes are extracted under suitable conditions with the necessary quantity of ammonium tartrate solution and the digestion mixture filtered or unfiltered be mixed with sugar, a suitable quantity of acid, and, if the fruit does not yield a sufficient quantity of pectin, some additional pectin preparation, an excellent jam or preserve may be obtained. Of course the principle could be employed in the preparation of similar products from most of the available dried fruits.

We claim:—

1. A process of manufacturing pectin extracts by the treatment of pectinous substances with dilute solution of suitable salts, capable of effecting an ionic exchange with the pectin and basic compounds to convert the insoluble natural salt into a soluble pectin permitting the recovery of substantially the whole of the pectin from the substances treated.

2. A process of manufacturing pectin extracts by the treatment of pectinous substances with dilute solutions of ammonium or alkali-metal salts of acid radicles capable of forming insoluble compounds with the alkaline earth metals.

3. A process of manufacturing pectin extracts by the treatment of pectinous substances such as apple pomace, with a dilute solution of ammonium tartrate, to convert the insoluble pectinogen and metallic pectates, as for example, calcium pectate into soluble pectinogen and its derivatives.

4. A process of manufacturing pectin extracts by treating apple pomace with 0.1–0.5% solution of ammonium tartrate at a temperature of 120° C. under pressure for a period of ten to thirty minutes.

5. The manufacture of pectin extracts as in claim 1, in which excessive acidity of the raw material is first reduced by electrodialysis.

6. A process of manufacturing pectin extracts as in claim 3, wherein the jellifying power of the extract is augmented by the subsequent addition of calcium salts.

7. A process of manufacturing pectin extracts as in claim 3, wherein the necessary acidity for jellification of the product is produced by removal through electrodialysis of the kation of the salt added in excess of the requirements of the main process.

8. A process of manufacturing pectin extracts from dried fruits as for example, prunes, by extraction of the fruit with the necessary quantity of a suitable salt, as for example, ammonium tartrate, the digestion mixture being converted into a preserve by mixture with sugar and a suitable quantity of acid.

9. A process of extracting or removing pectin from materials containing pectinous substances by treatment of the materials with dilute solutions of salts capable of rendering soluble substantially the whole of the pectinous content.

In testimony whereof we affix our signatures.

DINSHAW RATTONJI NANJI
FREDERIC JAMES PATON.